(12) United States Patent
Inha

(10) Patent No.: US 9,071,698 B2
(45) Date of Patent: Jun. 30, 2015

(54) CHARGING DEVICES FOR PORTABLE ELECTRONIC DEVICES

(75) Inventor: Kai Inha, Järvenpää (FI)

(73) Assignee: Nokia Corporation, Espoo (FI)

( * ) Notice: Subject to any disclaimer, the term of this patent is extended or adjusted under 35 U.S.C. 154(b) by 1881 days.

(21) Appl. No.: 11/993,766

(22) PCT Filed: Jun. 23, 2005

(86) PCT No.: PCT/EP2005/006871
§ 371 (c)(1),
(2), (4) Date: Mar. 19, 2010

(87) PCT Pub. No.: WO2006/136195
PCT Pub. Date: Dec. 28, 2006

(65) Prior Publication Data
US 2010/0184382 A1    Jul. 22, 2010

(51) Int. Cl.
*H04B 1/38*    (2006.01)
*H04M 1/00*    (2006.01)
*H04M 1/725*   (2006.01)
*H02J 7/00*    (2006.01)
*H02J 13/00*   (2006.01)

(52) U.S. Cl.
CPC .......... *H04M 1/7253* (2013.01); *H02J 7/0052* (2013.01); *H02J 13/0075* (2013.01)

(58) Field of Classification Search
None
See application file for complete search history.

(56) References Cited

U.S. PATENT DOCUMENTS

| 5,754,625 | A  | * | 5/1998  | Shimura .................... 455/554.1 |
| 6,215,282 | B1 | * | 4/2001  | Richards et al. ............. 320/160 |
| 6,429,622 | B1 | * | 8/2002  | Svensson ...................... 320/106 |
| 2002/0119800 | A1 | * | 8/2002  | Jaggers et al. ............... 455/550 |
| 2003/0015991 | A1 | * | 1/2003  | Tung et al. .................... 320/114 |
| 2003/0050011 | A1 |   | 3/2003  | Palermo et al. |
| 2003/0236091 | A1 | * | 12/2003 | Wonak et al. .............. 455/426.2 |
| 2004/0067411 | A1 | * | 4/2004  | Lisanke .......................... 429/90 |
| 2004/0185917 | A1 | * | 9/2004  | Fischedick et al. ........... 455/574 |
| 2004/0203481 | A1 | * | 10/2004 | Park et al. .................... 455/74.1 |
| 2004/0227523 | A1 | * | 11/2004 | Namaky ....................... 324/537 |
| 2004/0235535 | A1 | * | 11/2004 | Kajiwara et al. ............. 455/573 |
| 2005/0186953 | A1 | * | 8/2005  | Harris .......................... 455/419 |
| 2005/0239517 | A1 | * | 10/2005 | Ogino et al. .................. 455/573 |
| 2007/0096691 | A1 | * | 5/2007  | Duncan et al. ............... 320/114 |

FOREIGN PATENT DOCUMENTS

GB    2396261 A    6/2004

OTHER PUBLICATIONS

International Search Report of PCT/EP2005/006871 dated Nov. 11, 2005.
Written Opinion of PCT/EP2005/006871 dated Nov. 11, 2005.

* cited by examiner

*Primary Examiner* — Ayodeji Ayotunde
(74) *Attorney, Agent, or Firm* — Banner & Witcoff, Ltd.

(57) ABSTRACT

The present invention provides a charging device (100) for a portable electronic device (200), the charging device (100) arranged to provide power to the portable electronic device (200) upon physical coupling with the portable electronic device (200), the charging device (100) comprising one or more charging couplings to provide physical coupling (110, 210, 120, 220) of the charging device (100) to a portable electronic device (200), wherein the charging device (100) is arranged to transmit power and data via one or more of the couplings.

53 Claims, 2 Drawing Sheets

CHARGING DEVICES FOR PORTABLE ELECTRONIC DEVICES

INTRODUCTION

The present invention relates to charging devices for portable electronic devices.

The charging devices are arranged to provide power to the portable electronic devices, for example, to recharge one or more batteries (i.e. power cells) which themselves are used to provide power to the portable electronic device. The charging devices may independently supply (e.g. mains) power to the portable electronic device, and/or charge a rechargeable power cell within the portable electronic device. The charging devices include, but are not limited to, in-vehicle (e.g. in-car/motorbike) charging devices and desk-stand chargers, which are often used, for example, with mobile phones.

The portable electronic devices include, but are not limited to, audio players (including MP3/CD players), video players (including DVD), mobile phones, personal computers (including laptops), GPS receivers, or devices having one or more such functionality (e.g. Personal Digital Assistants (PDAs)).

The present invention also relates to appropriately modified portable electronic devices adapted for use with one or more aspects/embodiments of the charging device according to one or more aspects/embodiments of the present invention.

Specific aspects/embodiments of the present invention also relate to portable electronic devices having wireless connectivity functionality, and charging devices for such portable electronic devices. The wireless connectivity functionality of the portable electronic devices may comprise Bluetooth™, Wireless Local Area Network (WLAN), Wireless Universal Serial Bus (WUSB), Ultra Wide-Band (UWB), mobile cellular technology and/or developments thereof. The wireless connectivity functionality may comprise less traditional wireless connectivity, such as, optical connectivity, or near field magnetic connectivity (Radio Frequency Identification, RFID).

The above examples are not limiting. Some other form of wireless (non-physical connection path i.e. radio frequency) connectivity technology may be used. The connectivity technology may include radio elements comprising hardware and/or associated software (such as one or more processors, memory and antennae).

BACKGROUND TO THE INVENTION

Firstly, different charging devices can be used with different portable electronic devices. The capabilities of the different charging/portable devices are therefore not always suitably/optimally matched.

Secondly, wireless connectivity/functionality is becoming increasingly common. Users of portable devices are often unfamiliar, or cannot easily use, their wireless functionality. These issues give rise to particular problems.

Consider the situation of a car having Bluetooth™ connectivity to allow wireless connection between the car audio system (including speaker/microphone system) and a mobile phone.

The mobile telephone is connectable to the car audio system through a local Bluetooth™ wireless connection, between the mobile phone and the car audio system. Once the local connection between the phone and the car audio system has been made, a user (e.g. the driver) can use the mobile calling functionality of the mobile phone without necessarily having to use his hands to actuate one or more phone buttons. This is often called "hands-free" operation (although it is still possible, and sometimes required, to use your hands to activate one or more functions (or sub-functions) of the phone). Thus, upon connection, the functionality provided by the phone is usable through the car audio system, i.e. both the phone and the car audio system make use of the other's functionality.

Similarly, the music contained in a portable music player (e.g. stored on the hard drive of an MP3 player), once the music player is connected to a car audio system, can be heard through the car audio system. The functionality provided by the music player is usable through the car audio system, i.e. both the music player and the car audio system make use of the other's functionality.

Often, there is more than one device with which wireless connection (pairing) can be conducted. For example, in the above situation, one user may have more than one MP3 player and/or more than one phone, each of these electronic devices having wireless connectivity. Also, two or more users may drive the car, each of these users having their own wirelessly connectable electronic device. In such situations, pairing between the car audio system and the one or more of the multiple electronically connectable wireless devices may be confusing to a user (and/or not straightforward).

Often, such car audio systems are arranged to automatically search for all possible portable electronic devices with which pairing can be conducted, for example, upon car ignition (or depression of a particular button, or activation of such functionality). If the searching identifies that more than one electronic device can be used for pairing (whether it has been paired previously with the car audio system or whether this is "a first time pairing" between the audio system and the portable device), it is not necessarily straightforward for the system to know with which portable device pairing should be conducted. This is further elaborated below.

Take the example of a father getting into his car, with a wirelessly connectable (Bluetooth™) PDA switched on to allow pairing. His children are in the vicinity of the car with their respective MP3 players, also with their wireless connectivity (Bluetooth™) on and able to pair. In this example, the PDA and the respective MP3 players have been previously paired with the car audio/video system. The children may currently be listening to the music on their respective MP3 player via associated/paired Bluetooth earpieces.

Upon switching on the ignition, it is not readily apparent with which of the wirelessly connectable devices the car audio/video system should pair.

The same issues arise in an office/hotel/airport environment, or other such environments, in which multiple portable electronic devices (including laptops) can periodically wirelessly connect to an access point (e.g. by WLAN). In such cases, once pairing between the laptop and the access point has been made, the laptop makes use of the wireless connection to access the computer network to which the access point grants access.

Even though the aforementioned examples mention the mutual use of the functionality of two paired devices/systems/apparatus, the basic function of the pairing is to allow wireless communication between two paired devices/systems/apparatus.

SUMMARY OF THE INVENTION

In a first aspect, the present invention provides a charging device for a portable electronic device, the charging device arranged to provide power to the portable electronic device upon physical coupling with the portable electronic device, the charging device comprising one or more charging couplings to provide physical coupling of the charging device to a portable electronic device, wherein the charging device is arranged to transmit power and data via one or more of the couplings.

The data may be wireless connectivity data suitable to initiate wireless connection, with a physically coupled portable electronic device, over the air interface between the physically coupled portable electronic device and a wirelessly connectable device associated with the charging device.

The charging device may comprise wireless transmission components.

The charging device may be arranged to be associated with wireless transmission components of another device to use the wireless transmission components of that device to wirelessly connect with the coupled portable electronic device.

The wireless connectivity data may comprise the address of the portable electronic device used for wireless connection.

The wireless connectivity data may comprise the address of the charging device used for wireless connection.

The wireless connectivity data may comprise the address of an electronic device/system/apparatus with which the charging device is coupled, and wherein the address is used for wireless connection between the portable electronic device and the electronic device/system/apparatus.

The wireless connectivity data may relate to a particular ID for wireless connection.

The particular ID may relate to a previously wireless connection between the charging device and the physically coupled portable electronic device.

The particular ID may relate to a new wireless connection between the charging device and the physically coupled portable electronic device.

The wireless connectivity data may comprise unicast messaging between the charging device and the physically coupled portable electronic device.

The wireless connectivity data may comprise broadcast messaging between the charging device and the physically coupled portable electronic device.

One or more of the couplings may be termination points of transmission lines, one or more of the other end of the transmission lines providing connection to a charging device processor.

The provision of power and data may be under the control of the charging device.

The charging device may be one or more of an in-car charger, a desk-stand charger, a mobile phone charger, audio/video player charger, GPS receiver charger, personal computer charger or a PDA charger.

The charging device may be arranged to use mains power to provide power to the portable electronic device.

The charging device may be arranged to use power cell power to provide power to the portable electronic device.

The present invention also provides a portable electronic device adapted to couple with a charging device as previously mentioned and arranged to receive power and data via the physical coupling.

The portable electronic device may be arranged to provide data to the charging device.

The portable electronic device may be arranged to provide charging data to the charging device.

The portable electronic device may be arranged to provide wireless connectivity data to the charging device.

The charging device according to the present invention may be arranged to transmit power and data simultaneously via one or more of the couplings.

The charging device may be arranged to transmit power and data at separate times via one or more of the couplings.

The data may be charging data.

The data may be charging data, the charging data comprising data relating to the nature of the power provided by the charging device.

The data may be charging data, the charging data comprising data relating to the nature of the power requirements of the portable electronic device.

The data may be charging data, the charging data comprising data relating to configuring the provision of power for the particular coupled charging device and portable electronic device.

The data may be charging data, the charging data comprising data relating to the provision of power to components of the portable electronic device in a balanced manner.

The charging device may comprise switching to switch between charging and data transfer.

The charging device may comprise a processor arranged to control switching, the switching arranged to switch between charging and data transfer.

The charging device may comprise a processor arranged to control switching, the switching arranged to switch between charging and data transfer, and wherein the switching is comprised in the charging device.

The charging device may comprise a processor arranged to control switching, the switching arranged to switch between charging and data transfer, and wherein the switching is comprised in the portable electronic device.

The charging device may be arranged to intermittently switch between providing power and data.

The charging device may comprise only two charging couplings to provide physical coupling of the charging device to the portable electronic device and to provide power and data.

The charging device may comprise only two charging couplings to provide physical coupling of the charging device to the portable electronic device and to provide power and data, wherein one of the couplings provides a ground/common return path.

The present invention also encompasses one or more of the aforementioned aspects/embodiments of the invention in one or more combinations.

DESCRIPTION OF SPECIFIC EMBODIMENTS

Figure 1:
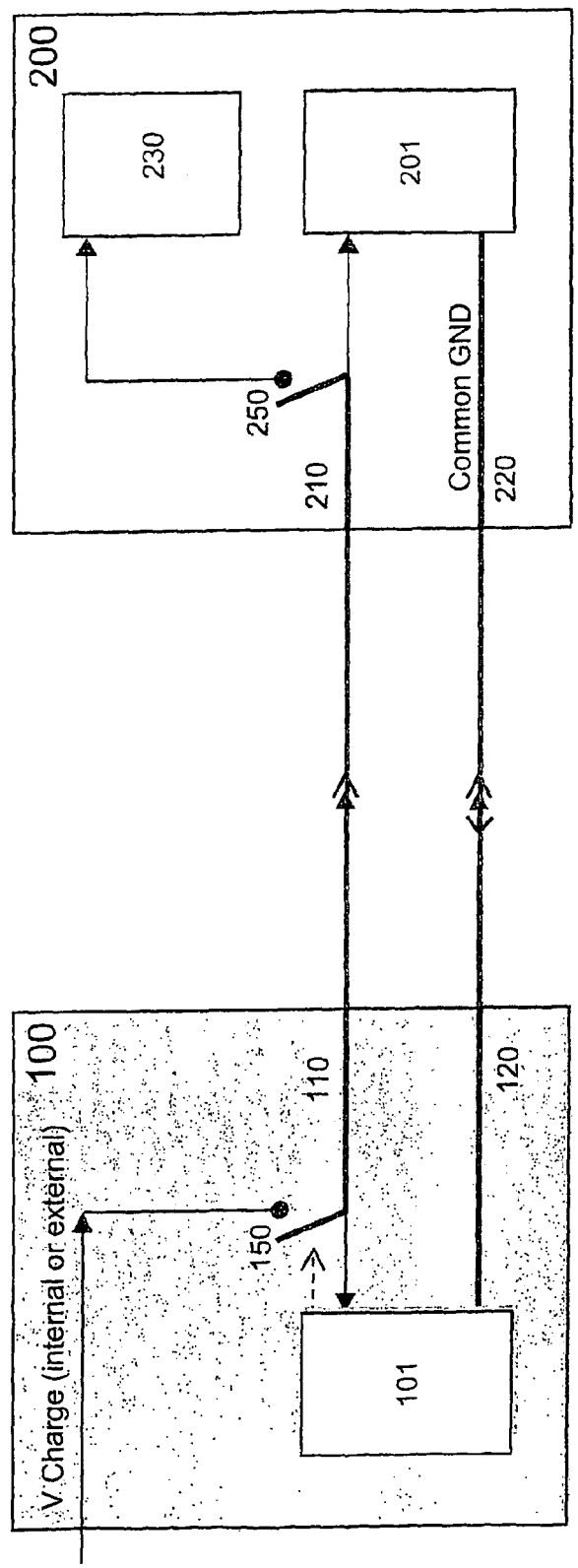
FIG. 1 provides a schematic illustration of a charging device and a mobile phone according to a first embodiment of the present invention.

A charging device (charger) 100 adapted for connection with a mobile phone device (phone) 200 is shown in FIG. 1. FIG. 1 represents a connected state in which the charger 100 and the phone 200 are physically connected via connection pins or couplings (not shown).

The charger 100 comprises two connection paths 110 and 120. The connection paths 110, 120 are provided for connection with corresponding connection paths 210, 220 in the phone 200. The respective connection paths 110, 210 and 120, 220 are connected to one another by appropriately located connection pins (not shown) located exterior to the respective charger/phone. Upon connection, the connection paths 110, 120 and 210, 220 are used to supply power from the charger 100 to charge the rechargeable battery 230 of the phone 200. The charge, which the charger 100 is arranged to supply, may be sourced either from an internal or external (e.g. mains) power source.

The charger 100 further comprises an Application Specific Integrated Circuit (ASIC) 101, which acts as a controller to control charging (and data transfer) down the connection paths. This is done via a switch 150. Specifically, the connection path 110 comprises a switch 150, which is arranged to be controlled by the ASIC 101. The switch 150 has two positions. The first position allows connection of the connection path 110 to the internal/external charging source for transfer of charge down the connection path 110. The second position disconnects the charging function by disconnecting the connection of the internal/external charging source to the connection path 110.

The connection path 120 does not have a switch. It is permanently connected to the ASIC 101.

At the phone 200, there is also an ASIC (or controller) 201. Similarly, the phone 200 comprises a switch 250, which also has two positions, in this case, controlled by the controller 201. The first position allows connection to the phone battery 230 to allow transfer of charge received down connection path 110 to the phone battery 230. The second position disconnects the charging function by disconnecting the connection of the connection path 210 to the phone battery 230.

The connection path 220 does not have a switch. It is permanently connected to the ASIC 201.

As there is no switching along connection path 120, 220, upon physical connection of the two connection paths via the connection pins (not shown), a connection between the two devices 100, 200 is always maintained. In charging mode, the connection path 120, 220 acts as a common ground.

Upon physical connection of the devices 100, 200, at least connection path 120, 220 provides a communication path between the two devices. Once switches 150, 250 are placed in their first position (or if switches 150, 250 are already in their first position) charging can occur. Charging cannot occur if one or more of the switches 150, 250 are in their second position.

The default position is that the switches 150, 250 are in their disconnected second position. Upon physical connection of the two devices 100, 200 (via the connection pins), the ASICs 101, 201 are arranged to communicate with one another along path 120, 220 i.e. there is data transfer between the two devices down connection path 120, 220, prior to charging. The ASICs 101, 201 are arranged to detect that physical connection of the two devices has occurred by virtue of a closed circuit being provided by the connection of connection paths 120, 220.

Upon the end of data transfer, and if appropriate, the ASICs are arranged to place the switches 150, 250 into their first charging position. This allows transfer of charge from the charger 100 to the phone 200 via connection path 110, 210. In the case that charging is not considered to be appropriate (e.g. the phone and the charger are not considered to be compatible) then the switches 150, 250 remain in their disconnected second position.

The data transfer that occurs prior to charging is sent down connection paths 120, 220. This data transfer relates to charging data. So for example, data relating to the maximum available current from the charger may be sent from the charger 100 to the phone 200. Correspondingly, data relating to the maximum available current the phone 200 can accept may (also) be sent from the phone 200 to the charger 100.

Charging data relating to whether the charger 100 is actually another battery driven device (e.g. like a portable desk-stand), that can only charge for a limited amount of time, and with limited amount of mA, may be transferred.

In the case the charging device is a solar panel, or other non-stable charging source, the charging data may be used to configure the charging connection to cope with the non-stable charging source.

Although the charger 100 in the above example is used to charge a rechargeable phone battery 230, it may be used to (also) supply power to the phone 200. So, the charger may be used to not only re-charge the battery 230, but also to supply power to phone components to make them operate.

In such cases, the charging data may be used to route power to particular components and the battery 230 in a balanced manner. Furthermore, if one or more of the phone components is activated from a dormant state during the charging process, then the connection may be arranged to further adapt the transfer of power to provide power to the relevant active components in a balanced manner. This may, for example, be by the ASIC 201 placing the switch 250 in the second disconnected position to stop charging/power supply, and then providing appropriate charging data down connection path 220, 120 to enable subsequent balanced charging/power to the relevant components.

In the above examples, the charging data is used to appropriately configure and/or optimise the charging/power supply for the particular charger 100 and phone 200 that are physically connected.

Either the charger ASIC 101 or the phone ASIC 201 can act as the master or slave in the aforementioned scenarios. So, for example, if the ASIC 101 is acting as the master, then it controls the data transfer down connection path 120, 220. It may decide both when the data is to be transferred, and what should be the content of the data to be transferred.

Let us now turn to a second aspect of the invention, particularly related to wireless connectivity.

Figure 2:
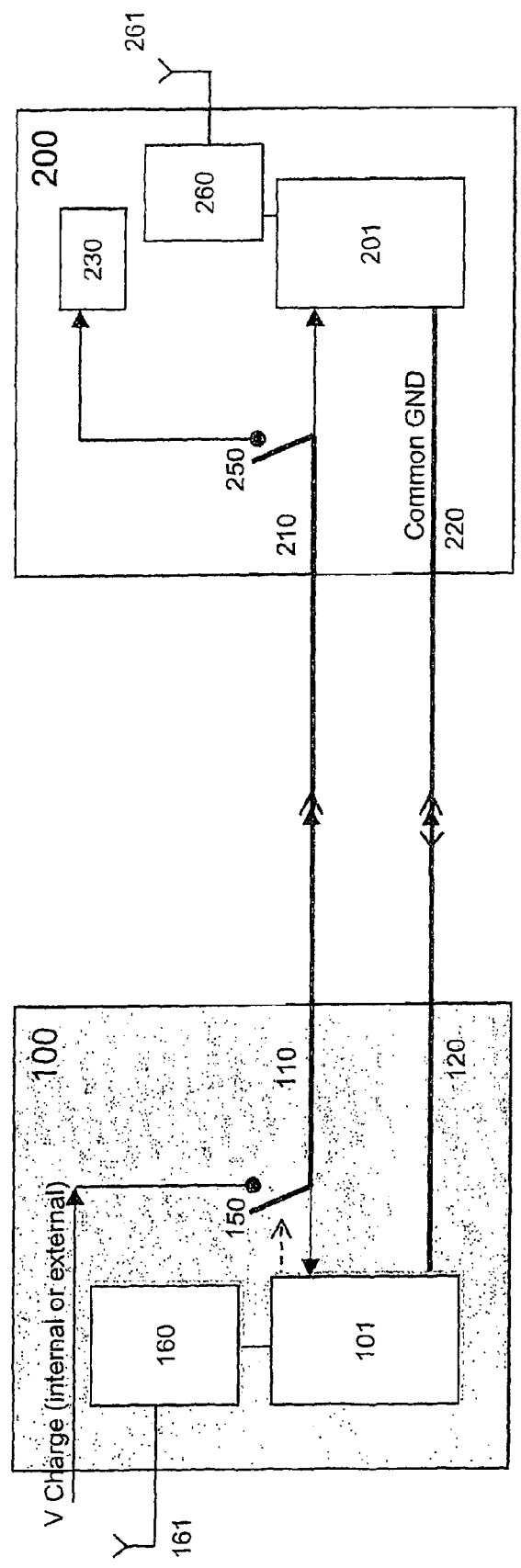
FIG. 2 provides a schematic illustration of a charging device and a mobile phone according to a second embodiment of the present invention.

FIG. 2 illustrates an embodiment of the invention in accordance with a second aspect of the present invention. The same reference numerals as FIG. 1 have been used where appropriate. However, in the embodiment of FIG. 2, the ASICs 101 and 201 are respectively connected to devices associated wireless transmission functionality (i.e. components) 160, 260.

The wireless transmission functionality comprises associated antennae 161, 261. The antennae 161, 261 may be considered to be part of their respective wireless transmission functionality 160, 260 or separate to it. One or more of the connections between the respective wireless transmission functionality 160, 260 and the respective ASICs 101, 201 may be wired (as shown in FIG. 2) or wireless (not shown).

The connection of the wireless transmission functionality 160, 260 to the ASICs 101, 201 allows the ASICs 101, 201 to transfer data between the ASIC and the respective wireless transmission functionality 160, 260. In the present example, the wireless transmission functionality comprises software and hardware (processors, memory and antennae) arranged to allow transmission of data conforming to the Bluetooth™ standard.

In the particular embodiment of FIG. 2, transfer of data down connection path 120, 220 provides transfer of wireless pairing information between the two devices 100, 200 down the physical connection path 120, 220. This transfer of wireless pairing information enables the respective devices 100, 200 to have the required pairing information to initiate mutual pairing via the wireless pairing functionality 160, 260. This will subsequently lead to wireless pairing between the two specific devices 100, 200 which are also physically connected via the connection path 120, 220. The transfer of pairing information may be in one direction, the opposing direction, or in both directions (see arrows on 120).

The respective ASICs 101, 102 transfer the relevant pairing information received via the physical connection path 120, 220 to their respective wireless functionality 160, 260 for subsequent pairing via respective antennae 161, 261. After transfer of the required pairing information down the physical connection path 120, 220, the ASICs 101, 102 allow charging to occur by controlling the switches 150, 250 to be in their first connected position.

The ASICs 101, 102 may also negotiate and/or agree that charging should be conducted for a specified period of time. After the expiry of this period of time, the ASICs are arranged to control the switches to be in their second disconnected position. This stops the charging (or power supply) process, and allows mutual data transfer down connection path 120, 220. The ASICs 101, 102 may then agree to continue charging with or without another charging break (which may or may not be of the same duration as the first break).

The transfer of data down connection path 120, 220 may also include profile information to transfer specific user personalised settings. In the above example, this data may be transferred prior to initial charging, or during a charging break. The user-personalised settings may, for example, be audio settings (e.g. volume, balance, graphic equaliser), seat/steering wheel position settings, video display positions (in relation to a user position) or video settings (in relation to a contrast, brightness etc), or favoured travel routes (for use in GPS travel systems), etc.

The transfer of wireless pairing information down the physical connection is particularly secure, and more secure than if it were transmitted over the wireless interface.

Let us now consider the nature of the pairing messages. The nature of the pairing messaging may be to allow pairing of previously paired devices or allow a new pairing.

Upon physical connection via the connection pins, the charger ASIC 101 may send an enquiry message to the phone ASIC 201. The phone ASIC 201 may respond with a particular identification code (ID), associated with that particular phone 200 (and possibly unique, or practically unique, to that phone 200). This may, for example, involve the transmission of Bluethooth™ addresses or WLAN MAC addresses, used in wireless pairing, over the physical connection. The transmission of addresses may be for both the charger 100, the phone 200, or a device/system/apparatus (e.g. car audio system) associated with the charger 100.

The particular ID may be unique to a particular pairing session between two or more specific devices. So, for example, on a previous occasion that the two devices paired, they may have established a particular code which at least signifies that connection was previously made (or to use in subsequent pairing sessions).

The charger ASIC 101 will then consider whether a pairing has been previously made, by checking the particular ID with a store of previously used or allowable IDs. If a match is found, the charger ASIC 101 sends a secure code to its associated wireless functionality 160 (and possibly to the phone ASIC 201). This code is to be used by the respective wireless functionalities 160, 260 to establish secure wireless connection. The secure code may, for example, be used to modulate the data that is transmitted wirelessly.

Instead of sending a secure code, the ASIC may send messaging to initiate wireless connection at a specific time in the future. Specific times may be calculated by mutual knowledge of the clock speeds of the ASICs 101, 201.

Upon identification of a particular previously paired device 200 (e.g. by using the particular ID of the device 200), the ASIC 101 may be arranged to cause the wireless functionality 160 to send a unicast message (directed to the specific previously device, for example using the particular device ID).

The ASIC 101 could, during some stage, also consider whether any particular user profile for that ID has been stored, and recall that stored user profile to adapt the functionality of the device associated with the charger. If no profile has been found, the ASIC 101 could request the profile information from the ASIC 201, either through the physical connection path and/or via the wireless interface.

In the above example, the charger 100 first sends a request and therefore can be considered to be the master device. In other embodiments, the phone 200 can be the master device and can control the pairing between the devices.

Turning now to the case of a new pairing, this is preferably performed after the check for a previous pairing (as above). If no previous pairing is found, then secure pairing can be conducted at least partially via the physical connection path. At least some sort of pairing initiation is done via the physical connection path. Similar to the previous example, a particular pairing ID may be set up and/or a security code may be transmitted via the physical connection path.

In a further embodiment, the pairing may not consider whether a previous pairing with the charger 100 and the phone 200 has occurred. Upon physical connection of the two devices 100, 200, the devices are arranged to exchange address information over the physical connection. The exchanged address information will, by default, be used to initiate and establish wireless connection. This default process can be over-ridden by manual intervention, by using the user interface of the phone 200 and/or charger 100. Thus, when a device 200 is placed in the charger 100, it becomes wirelessly paired.

In general terms, the present invention provides that the physical connection of the two devices is detected by the ASICs 101, 201. This detection of physical connection is then used to initiate a wireless connection. This may, for example, activate a periodic enquiry message (sent via the radio interface, i.e. wireless functionality 160, 260) to discover which devices are available for pairing. This detection of the physical connection of the two devices 100, 200 by the ASICs 101, 201 may be used to activate previously deactivated/dormant wireless functionality 160, 260. The pairing may be done completely over the wireless radio interface, or as previously described, at least partially via the physical connection path.

Broadcast transmissions, such as pairing requests, normally sent via the wireless interface may be sent via the physical connection path. In this way, only the specific connected device (or the charger 100 in the case the phone is the master/host) will receive the broadcast message and therefore respond.

The initiation of wireless pairing may be done completely automatically, or partly automatically, for example, following user authorisation/involvement. In such circumstances, upon detection of the physical connection, the ASICs 101, 201 would send an appropriate confirmation request to a corresponding user interface of the device 100, 200. Upon confirmation received via one or more of the corresponding user interfaces, the pairing could then continue by, for example, one or more of the previously mentioned methods.

The confirmation received via one or more of the user interfaces may be the input of a pairing code. For example, the user may input a four digit pairing code at the portable electronic device 200 user interface. If this pairing code is recognised, then the pairing would continue. The continuation of the pairing may occur following input of the same four digit pairing code on the charger 100 user interface (or a user interface associated with the charger e.g. the vehicle audio/video user interface), or recognition that this pairing code is a previously used pairing code.

The ASICs 101, 201 can be arranged to detect the physical connection by, for example, receiving clock signalling via one or more of the connection paths 120, 220 and 210 120. Any suitable method/configuration can be used.

One or more of the previously described aspects and embodiments of the invention may be used in one or more possible combinations. Various modifications can be made to the invention without departing from the scope of the present invention.

For example, in the second aspect of the invention, although the wireless functionality 160 associated with the charger 100 is shown to be part of the charger in FIG. 2, it should not be limited to being physically part of the same device 100. It could be remote to the charger 100 and be part of another device/system/apparatus but still (physically) connected to the charger. For example, it could be part of the audio system of the car, and have a wired connection to the charger.

Furthermore, data transfer may be simultaneously and/or additionally provided along connection path 110 and 210 as well as connection path 120, 220.

In a further embodiment, there may be a single connection path between the two devices i.e. connection path 110, 210, and/or no always-connected connection path 120, 220. In such a case, this connection path would sometimes transfer data and at other times transfer charge.

It a further embodiment still, the charge transmitted down the connection path may be modulated with data. Switching 150, 250 may therefore not be required.

There may be the charger switch 150, but no phone switch 250. In such embodiments, the charger switch 150 is used to control charge/power supply to the phone 200.

The switches 150, 250 may have a second position in which the connection path 110, 210 is disconnected from providing charging, but connected to the respective ASICs 101, 201 to allow transmission of data between the ASICs 101, 201.

The respective switches 150, 250 may also not be limited to a single switch.

Although a specific example is given for wireless connectivity via Bluetooth™, it should be understood that the present invention is not necessarily limited to wireless connectivity via Bluetooth™.

Furthermore, although embodiments refer to the use of ASICs, the processors used may general purpose rather than application specific processors.

The invention claimed is:

1. A charging device comprising:
 one or more couplings configured to permit wired connection of the charging device to a portable electronic device, wherein the charging device is configured to:
  select between (a) enabling power transfer over the one or more couplings to charge the portable electronic device, and (b) enabling data transmission over the one or more couplings; and
  based on data transferred over the one or more couplings, cause a wireless data connection to be established with the portable electronic device.

2. The charging device according to claim 1, wherein the charging device comprises a processor and wireless transmission components, wherein the processor is configured to cause the charging device to:
 after data transmission over the one or more couplings is enabled, receive wireless connectivity data from the portable electronic device via the one or more couplings, and
 transfer pairing information corresponding to the wireless connectivity data to the wireless transmission components.

3. The charging device according to claim 2, wherein the wireless transmission components are configured to use the pairing information to establish the wireless data connection, wherein the wireless data connection is between the charging device and the portable electronic device.

4. The charging device according to claim 1, wherein the charging device is arranged to be associated with wireless transmission components of another device, and wherein the charging device is configured to cause the wireless transmission components of the another device to establish the wireless data connection with the portable electronic device.

5. The charging device according to claim 1, wherein the data transferred over the one or more couplings comprises an address of the portable electronic device usable when establishing the wireless data connection.

6. The charging device according to claim 1, wherein the data transferred over the one or more couplings comprises an address of the charging device used for wireless connection.

7. The charging device according to claim 1, wherein the data transferred over the one or more couplings comprises an address of an electronic apparatus in communication with the charging device, and wherein the address of the electronic apparatus is usable when establishing the wireless data connection, wherein the wireless data connection is between the portable electronic device and the electronic apparatus.

8. The charging device according to claim 1, wherein the data transferred over the one or more couplings relates to a particular ID for establishing the wireless data connection.

9. The charging device according to claim 8, wherein the particular ID relates to a previous wireless connection between the charging device and the portable electronic device.

10. The charging device according to claim 8, wherein the particular ID relates to a new wireless connection between the charging device and the portable electronic device.

11. The charging device according to claim 1, wherein the data transferred over the one or more couplings comprises unicast messaging data between the charging device and the portable electronic device.

12. The charging device according to claim 1, wherein the data transferred over the one or more couplings comprises broadcast messaging data between the charging device and the portable electronic device.

13. The charging device according to claim 1, wherein the one or more couplings comprise termination points of transmission lines, and wherein one or more of the transmission lines includes an end that provides a connection to a charging device processor.

14. The charging device according to claim 1, wherein the charging device is configured to control whether power or data is transferred over the one or more couplings.

15. The charging device according to claim 1, wherein the charging device comprises one or more of an in-car charger, a desk-stand charger, a mobile phone charger, audio/video player charger, GPS receiver charger, personal computer charger, or a PDA charger.

16. The charging device according to claim 1, wherein the power transferred over the one or more couplings comprises at least one of mains power or power cell power.

17. A portable electronic device comprising:
one or more couplings configured to permit wired connection of the portable electronic device to a charging device, wherein the portable electronic device is configured to:
select between (a) enabling power transfer over the one or more couplings to charge the portable electronic device, and (b) enabling data transmission over the one or more couplings; and
based on data transferred over the one or more couplings, cause a wireless data connection to be established with the portable electronic device.

18. The portable electronic device according to claim 17, wherein the portable electronic device is configured to provide, after data transmission over the one or more couplings is enabled, data to the charging device via the one or more couplings.

19. The portable electronic device according to claim 18, wherein the portable electronic device is configured to provide, after data transmission over the one or more couplings is enabled, charging data to the charging device via the one or more couplings.

20. The portable electronic device according to claim 18, wherein the portable electronic device is configured to transmit, after data transmission over the one or more couplings is enabled and in response to receiving wireless connectivity data from the charging device via the one or more couplings, additional wireless connectivity data to the charging device via the one or more couplings.

21. The charging device according to claim 1, wherein the data transferred over the one or more couplings comprises charging data.

22. The charging device according to claim 21, wherein the charging data relates to how the power transfer is to be performed.

23. The charging device according to claim 21, wherein the charging data specifies a power requirement of the portable electronic device.

24. The charging device according to claim 21, wherein the charging data relates to how a power supply that supplies power for the power transfer is to be configured.

25. The charging device according to claim 21, wherein the charging data relates to providing the power to components of the portable electronic device in a balanced manner.

26. The charging device according to claim 1, wherein the charging device comprises a switch configured to switch between a first state for selecting to enable the power transfer over the one or more couplings and a second state for selecting to enable the data transmission over the one or more couplings.

27. The charging device according to claim 26, wherein the charging device comprises a processor configured to cause the charging device to control the switch between the first state and the second state.

28. The charging device according to claim 1, wherein the charging device comprises a processor configured to cause the charging device to control switching components of the portable electronic device to switch between a first state for selecting to enable the power transfer over the one or more couplings and a second state for selecting to enable the data transmission over the one or more couplings.

29. The charging device according to claim 1, wherein the charging device is configured to intermittently switch between selecting to enable the power transfer over the one or more couplings and selecting to enable the data transmission over the one or more couplings.

30. The charging device according to claim 1, wherein the one or more couplings comprise a first coupling configured to provide the power transfer or the data transmission based on which is enabled for transfer, and a second coupling configured to provide a ground between the portable electronic device and the charging device.

31. The charging device according to claim 1, wherein the one or more couplings comprise at least two couplings and wherein one of the at least two couplings provides a ground.

32. The charging device according to claim 1, wherein the charging device is configured to:
initiate the wireless data connection between the charging device and the portable electronic device using the data transferred over the one or more couplings, and
based on the initiation, transmit data to the portable electronic device via the wireless data connection.

33. The charging device according to claim 32, wherein the charging device is configured to:
based on the initiation, generate and store an identification code configured to identify a wireless pairing session between the charging device and the portable electronic device.

34. A charging device comprising:
one or more couplings configured to permit wired connection of the charging device to a portable electronic device, wherein the charging device is configured to:
select between (a) enabling power transfer over the one or more couplings to charge the portable electronic device, and (b) enabling data transmission over the one or more couplings; and
based on data transferred over the one or more couplings, cause a wireless data connection to be established by the portable electronic device.

35. The charging device according to claim 34, wherein the charging device comprises a processor and wireless transmission components, wherein the processor is configured to cause the charging device to:
after data transmission over the one or more couplings is enabled, receive wireless connectivity data from the portable electronic device via the one or more couplings, and
transfer pairing information corresponding to the wireless connectivity data to the wireless transmission components.

36. The charging device according to claim 35, wherein the wireless transmission components are configured to use the pairing information to establish the wireless data connection, wherein the wireless data connection is between the charging device and the portable electronic device.

37. The charging device according to claim 34, wherein the charging device is arranged to be associated with wireless transmission components of another device, and wherein the charging device is configured to cause the wireless transmission components of the another device to establish the wireless data connection with the portable electronic device.

38. The charging device according to claim 34, wherein the data transferred over the one or more couplings comprises an address of the portable electronic device usable when establishing the wireless data connection.

39. The charging device according to claim 34, wherein the data transferred over the one or more couplings comprises an address of the charging device used for wireless connection.

40. The charging device according to claim 34, wherein the data transferred over the one or more couplings comprises an address of an electronic apparatus in communication with the charging device, and wherein the address of the electronic apparatus is usable when establishing the wireless data connection, wherein the wireless data connection is between the portable electronic device and the electronic apparatus.

41. The charging device according to claim 34, wherein the data transferred over the one or more couplings relates to a particular ID for establishing the wireless data connection.

42. The charging device according to claim 41, wherein the particular ID relates to a previous wireless connection between the charging device and the portable electronic device.

43. The charging device according to claim 41, wherein the particular ID relates to a new wireless connection between the charging device and the portable electronic device.

44. The charging device according to claim 34, wherein the data transferred over the one or more couplings comprises unicast messaging data between the charging device and the portable electronic device.

45. The charging device according to claim 34, wherein the data transferred over the one or more couplings comprises broadcast messaging data between the charging device and the portable electronic device.

46. The charging device according to claim 34, wherein the one or more couplings comprise termination points of transmission lines, and wherein one or more of the transmission lines includes an end that provides a connection to a charging device processor.

47. The charging device according to claim 34, wherein the charging device is configured to control whether power or data is transferred over the one or more couplings.

48. The charging device according to claim 34, wherein the charging device comprises one or more of an in-car charger, a desk-stand charger, a mobile phone charger, audio/video player charger, GPS receiver charger, personal computer charger, or a PDA charger.

49. The charging device according to claim 34, wherein the power transferred over the one or more couplings comprises at least one of mains power or power cell power.

50. A portable electronic device comprising:
  one or more couplings configured to permit wired connection of the portable electronic device to a charging device, wherein the portable electronic device is configured to:
    select between (a) enabling power transfer over the one or more couplings to charge the portable electronic device, and (b) enabling data transmission over the one or more couplings; and
    based on data transferred over the one or more couplings, cause a wireless data connection to be established by the portable electronic device.

51. The portable electronic device according to claim 50, wherein the portable electronic device is configured to provide, after data transmission over the one or more couplings is enabled, data to the charging device via the one or more couplings.

52. The portable electronic device according to claim 51, wherein the portable electronic device is configured to provide, after data transmission over the one or more couplings is enabled, charging data to the charging device via the one or more couplings.

53. The portable electronic device according to claim 51, wherein the portable electronic device is configured to transmit, after data transmission over the one or more couplings is enabled and in response to receiving wireless connectivity data from the charging device via the one or more couplings, additional wireless connectivity data to the charging device via the one or more couplings.

* * * * *